US006665905B2

United States Patent
Wegner et al.

(10) Patent No.: US 6,665,905 B2
(45) Date of Patent: Dec. 23, 2003

(54) WIPER BLADE

(75) Inventors: Norbert Wegner, Buehl (DE); Edwin Luyperts, Mol (BE)

(73) Assignee: Robert Bosch GmbH, Stuttgart (DE)

( * ) Notice: Subject to any disclaimer, the term of this patent is extended or adjusted under 35 U.S.C. 154(b) by 14 days.

(21) Appl. No.: 10/070,744

(22) PCT Filed: Jul. 5, 2001

(86) PCT No.: PCT/DE01/02503

§ 371 (c)(1),
(2), (4) Date: Jun. 4, 2002

(87) PCT Pub. No.: WO02/06100

PCT Pub. Date: Jan. 24, 2002

(65) Prior Publication Data

US 2002/0162185 A1 Nov. 7, 2002

(30) Foreign Application Priority Data

Jul. 15, 2000 (DE) .......................................... 100 34 475

(51) Int. Cl.[7] .................................................. B60S 1/38
(52) U.S. Cl. ................................. 15/250.48; 15/250.41
(58) Field of Search ......................... 15/250.41, 250.48, 15/250.4, 248, 250.361

(56) References Cited

U.S. PATENT DOCUMENTS

| 2,926,375 | A | * | 3/1960 | Flynn | 15/250.48 |
|---|---|---|---|---|---|
| 3,021,548 | A | | 2/1962 | Stoller | |
| 3,092,866 | A | * | 6/1963 | Jennings et al. | 15/250.48 |
| 3,417,421 | A | * | 12/1968 | Retke | 15/250.41 |
| 3,545,028 | A | * | 12/1970 | Poland | 15/250.48 |
| 3,828,388 | A | * | 8/1974 | Fuhr | 15/250.41 |
| 5,732,436 | A | * | 3/1998 | Feigenbaum | 15/250.41 |

FOREIGN PATENT DOCUMENTS

| DE | 30 05 965 C2 | | 3/1989 | |
|---|---|---|---|---|
| DE | 44 10 446 A1 | | 10/1994 | |
| DE | 199 35 858 A1 | | 2/2001 | |
| GB | 2069326 A | * | 8/1981 | B60S/1/38 |
| NL | 7409913 a1 | * | 1/1976 | B60S/1/38 |
| WO | WO 9420339 A1 | * | 9/1994 | B60S/1/38 |
| WO | 01 08948 A | | 2/2001 | |

* cited by examiner

*Primary Examiner*—Robert J. Warden, Sr.
*Assistant Examiner*—S Balsis
(74) *Attorney, Agent, or Firm*—Michael J. Striker

(57) ABSTRACT

A wiper blade for cleaning motor vehicle windows has a wiper strip (12) which is surrounded by a guard profile (14) that with extensions (26, 28) formed onto its side cheeks (22, 24) engages longitudinal grooves (50, 52) of the wiper strip (12) and is fixed axially on the wiper strip (12) by inward-protruding protrusions (30, 32) in the region of its face ends (18, 20). The protrusions (30, 32) originate at one side cheek (22, 24) of the guard profile (14), and a first protrusion (30) extends on the outer face end (18) of the guard profile (14) to touch the opposite side cheek (22, 24) of the guard profile (14), while a second protrusion (32) on the inner face end (20) forms a gap (38) from the opposed side cheek (22, 24), which the gap allows mounting or unmounting of the guard profile (14) in the longitudinal direction (40, 42).

8 Claims, 4 Drawing Sheets

WIPER BLADE

BACKGROUND OF INVENTION

The invention is based on a wiper blade.

Known windshield wipers for motor vehicles have a wiper arm, which is constructed of a fastening part, fastened to a drive shaft; a hinge part connected to it via a toggle joint; and a wiper rod rigidly adjoining the hinge part. A wiper blade with a wiper strip is pivotably connected to the wiper arm and guided over a motor vehicle window; the hinge part and the wiper blade are embodied such that the wiper strip can adapt to a curvature of the motor vehicle window. A requisite contact pressure of the wiper strip on the motor vehicle window is achieved with at least one tension spring, which braces the fastening part and the hinge part jointly with the wiper rod, via the toggle joint.

The wiper strip comprises an elastomer, such as a natural or synthetic rubber, or ethylenepropylene. It has a head strip, which via a tilting rib located between two longitudinal grooves is joined to a wiper lip resting on the vehicle window. By means of the tilting rib, the wiper lip at the turning point of the wiper motion can fold over in the opposite direction, so that it always assumes a favorable positioning angle relative to the windshield. If the windshield wiper is actuated, the wiper strip with the wiper lip slides over the motor vehicle window, and it wears down from friction between the wiper lip and the windshield. Environmental factors also affect the wiper strip, such as temperature fluctuations, UV radiation, saltwater, exhaust gases, and so forth, which can lead to premature aging of the material and increased wear.

To assure that when a new motor vehicle is shipped the wiper strip is in perfect condition, it is known from German Patent DE 30 05 965 C2 to cover the wiper strip with a guard profile before the motor vehicle is put in preservative. The guard profile is not removed until the new motor vehicle, after the preservative is removed, is handed over to a buyer. The guard profile has two side cheeks extending in the longitudinal direction, on which shoulders are formed that engage the longitudinal grooves on both sides of the tilting rib of the wiper strip. To enable cleaning the vehicle window so that the motor vehicle can be maneuvered, if the vehicle window during temporary storage of the motor vehicle or in the sealing process and so forth becomes soiled or the view is obstructed by rain, the guard profile has a wiper lip on its outer contour. As a rule, the guard profile comprises a suitable plastic.

To fasten the guard profile in such a way that it cannot be lost from the wiper blade and to protect the wiper strip on its face end from environmental factors, it is also known to weld the guard profile on the face end. To that end, the guard profile is heated on the lateral face ends and pressed against a plate. This creates a plate of material that closes off the guard profile. Before mounting, only one face end can be welded. If the second face end is welded after the guard profile has been slipped onto the wiper strip, then the guard profile has to be cut open for unmounting, which destroys it so that it cannot be used again.

From German Patent Disclosure DE 44 10 446 A1, a similar guard profile is also known, which for axial securing to the wiper strip has inward-pointing evulsions in the extensions in the region of the face ends. The evulsions block a longitudinal displacement of the guard profile, and their height is dimensioned such that they cannot penetrate into the longitudinal grooves. They are produced by drawing, for instance by ball upsetting.

In the earlier German Patent Application DE 199 35 858.3, a guard profile is described which has inward-pointing protrusions on its ends that originate at the side cheeks and extend either as far as the opposite side cheek or form a gap from the side cheek that allows mounting on a wiper strip. The protrusions can be combined with other closures for the face ends, such as a cap or a welded face end. The guard profile is fixed axially to the wiper strip by the closures or protrusions.

SUMMARY OF THE INVENTION

According to the invention, the protrusions originate at one side cheek of the guard profile, and a first protrusion extends, near the outer face end of the guard profile, to close to the opposite side cheek of the guard profile, while a second protrusion near the inner face end forms a gap from the opposed side cheek, which gap allows mounting or unmounting of the guard profile in the longitudinal direction. The protrusions can be made quickly and simply, for instance in the case of metal guard profiles with a kind of tongs or plastic profiles with a heat source, especially an ultrasonic source by means of an ultrasound probe.

Upon a pivoting motion of the windshield wiper over a vehicle window, force components that are especially pronounced if the vehicle window is dry or quite dirty or in wiper systems with four-bar control or a reciprocating gear act on the guard profile in the axial direction. In a four-bar control or reciprocating gear, the pivoting motion of the windshield wiper has a reciprocating motion superimposed on it, in order to increase the size of the swept field. However, in that case, major forces are exerted axially on the wiper blade. These forces tend to displace the guard profile in the direction of the inner circle, that is, the inner face end, of the wiper blade. Depending on the magnitude of the axial forces, the closures on the outer face end of the guard profile, if they are suitable for unmounting, experience excessive pressure. As a consequence, the guard profile creeps inward. This severely impairs the outcome of wiping, and part of the wiper strip, which is to be protected, of the windshield wiper is laid bare.

The wiper blade of the invention has a guard rail, which on the outer face end is closed by a protrusion extending transversely to the opening; this protrusion originates at one side cheek and extends as far as the opposite side cheek of the guard profile. This closure does not allow mounting or unmounting. As a result, it is assured that even under major axial forces the guard profile cannot creep inward. Nevertheless, it can be mounted and unmounted via the inner face end that has less of a load on it, so that it can be re-used multiple times.

Expediently, the length of the protrusions decreases in the direction of a wiper lip that is provided on the outer contour of the guard profile. Thus the protrusions essentially follow the inner contour of the side cheeks, so that the first protrusion can closely adjoin the opposed side cheek, and the gap between the second protrusion and the opposed side cheek remains virtually constant in width. The second protrusion has an inclined chamfer relative to the mounting direction, which chamfer, in the mounting process orients the wiper lip of the wiper strip toward the gap. This greatly simplifies mounting of the guard profile. To make unmounting easier as well, the second protrusion has an inclined chamfer relative to the unmounting direction, which chamfer, in the unmounting process orients the wiper lip of the wiper strip toward the gap. Expediently, the chamfer operative in the mounting direction, with a cross-sectional plane forms a larger angle than the chamfer operative in the unmounting direction, since the chamfer operative in the unmounting direction must during wiping operation assure a secure fixation of the guard profile with respect to outward-acting axial forces.

To assure the correct mounting of the guard profile in an automated mounting apparatus as well, it is expedient that the first protrusions differ in form, in particular in cross section and/or longitudinal section, from the second protrusions. As a result, the inner and outer ends of the guard profile can be identified simply and reliably. Moreover, the various protrusions can each be provided on different side cheeks of the guard profile.

The protrusions can be made quickly and simply, for instance in the case of metal profiles with a kind of tongs and in plastic profiles with a heat source, in particular an ultrasonic source by means of an ultrasonic probe; advantageously, the first protrusions on the outer face end of the guard profile can be welded to the opposed side cheek. This enhances the strength and shape stability, in particular transversely to the side cheeks in the critical end region.

BRIEF DESCRIPTION OF DRAWINGS

Further advantages will become apparent from the ensuing drawing description. In the drawing, one exemplary embodiment of the invention is shown. The drawing, description and claims include numerous characteristics in combination. One skilled in the art will expediently consider the characteristics individually as well and put them together to make useful further combinations.

Shown are.

DESCRIPTION OF THE PREFERRED EMBODIMENTS

Figure 1:
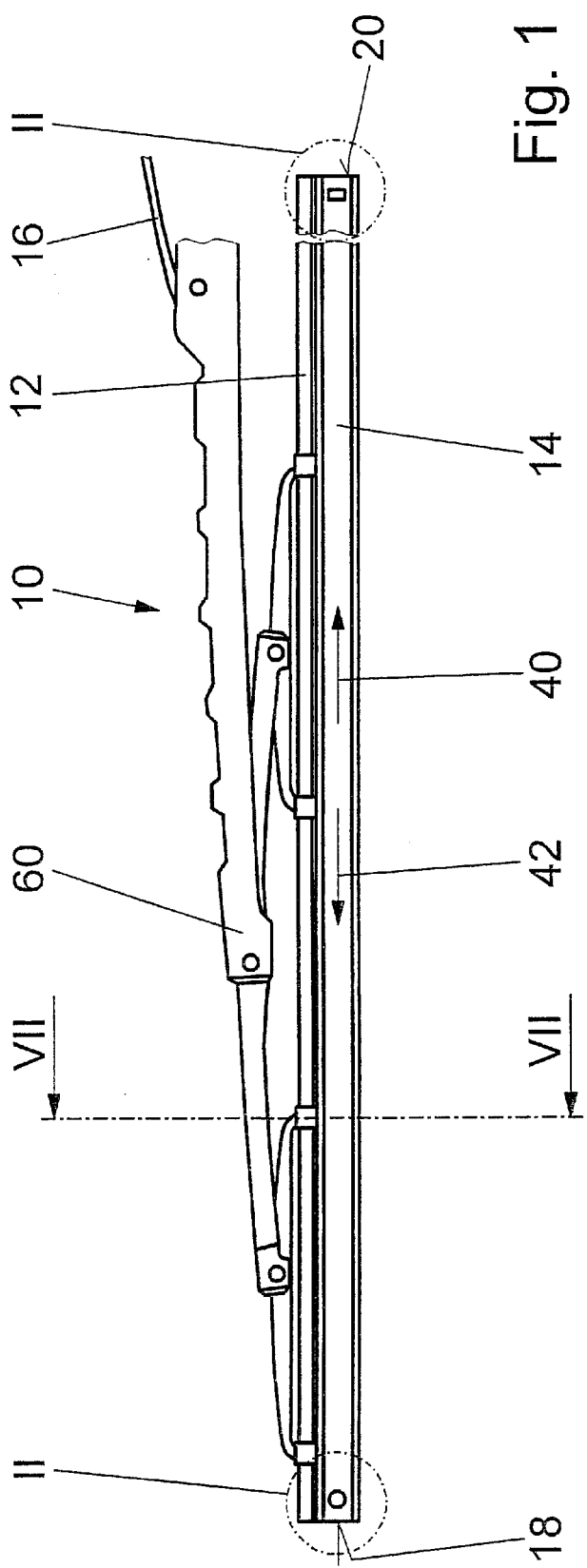
FIG. 1, a fragmentary view of a wiper blade.
Figure 2:
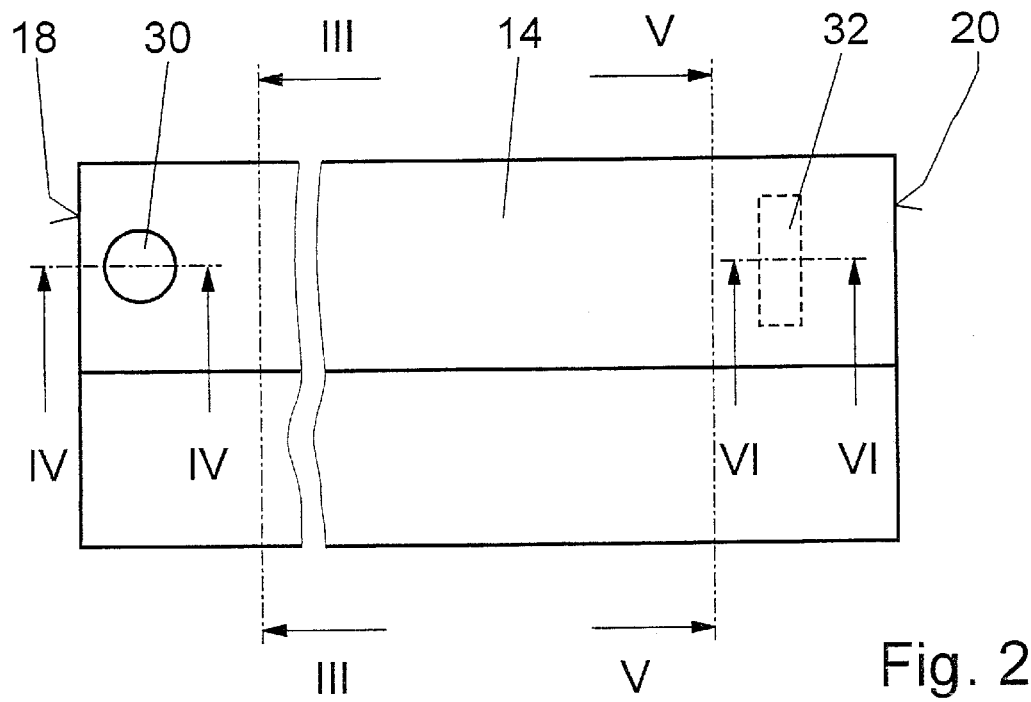
FIG. 2, an enlarged fragmentary view of the ends of a guard profile taken along the line II in FIG. 1.
Figure 3:
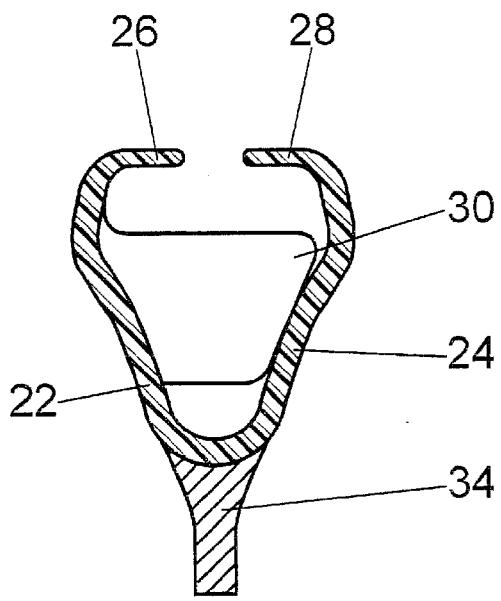
FIG. 3, a section taken along the line III—III in FIG. 2.
Figure 4:
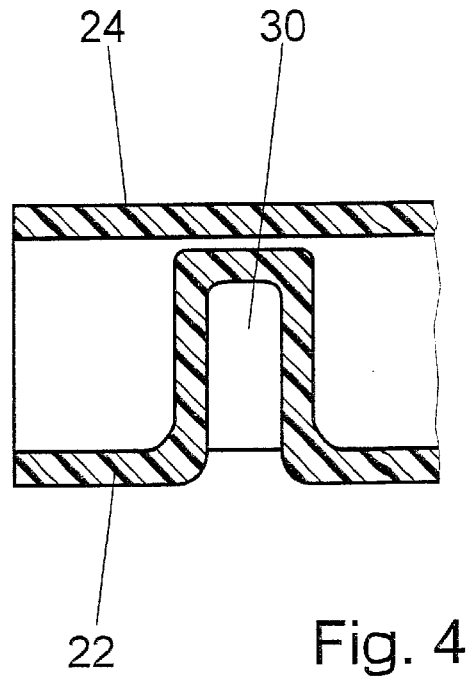
FIG. 4, a section taken along the line IV—IV in FIG. 2.
Figure 5:
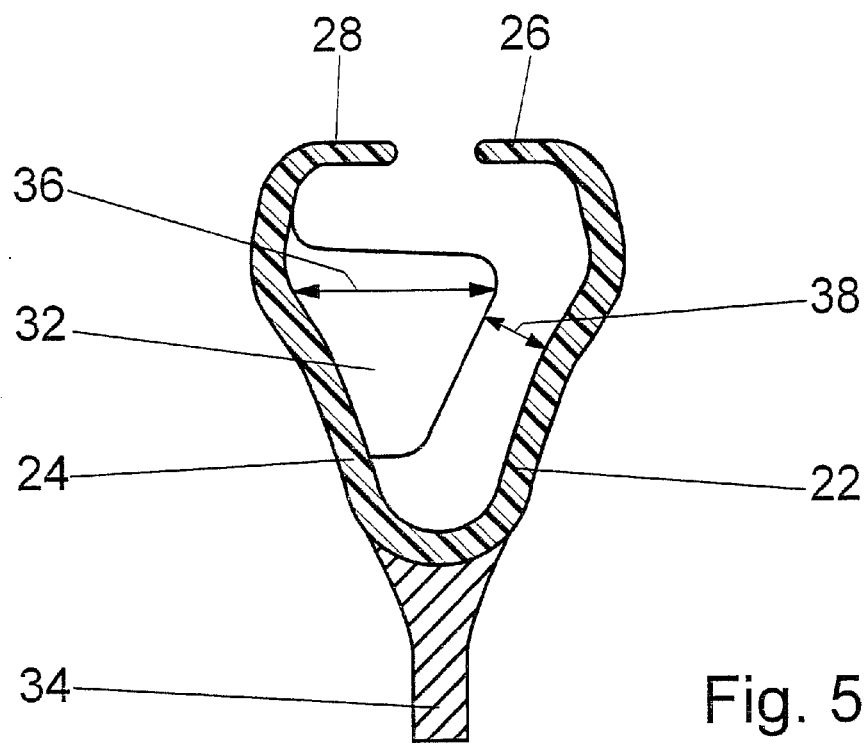
FIG. 5, a section taken along the line V—V in FIG. 2.
Figure 6:
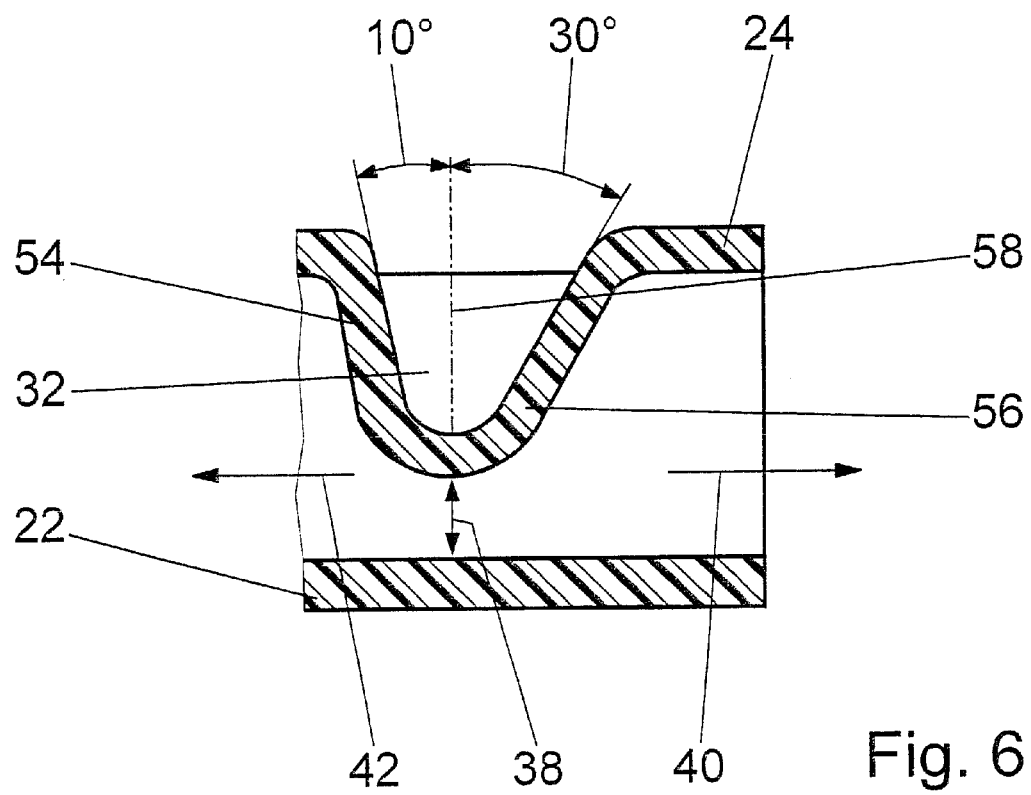
FIG. 6, a section taken along the line VI–VI in FIG. 2.
Figure 7:
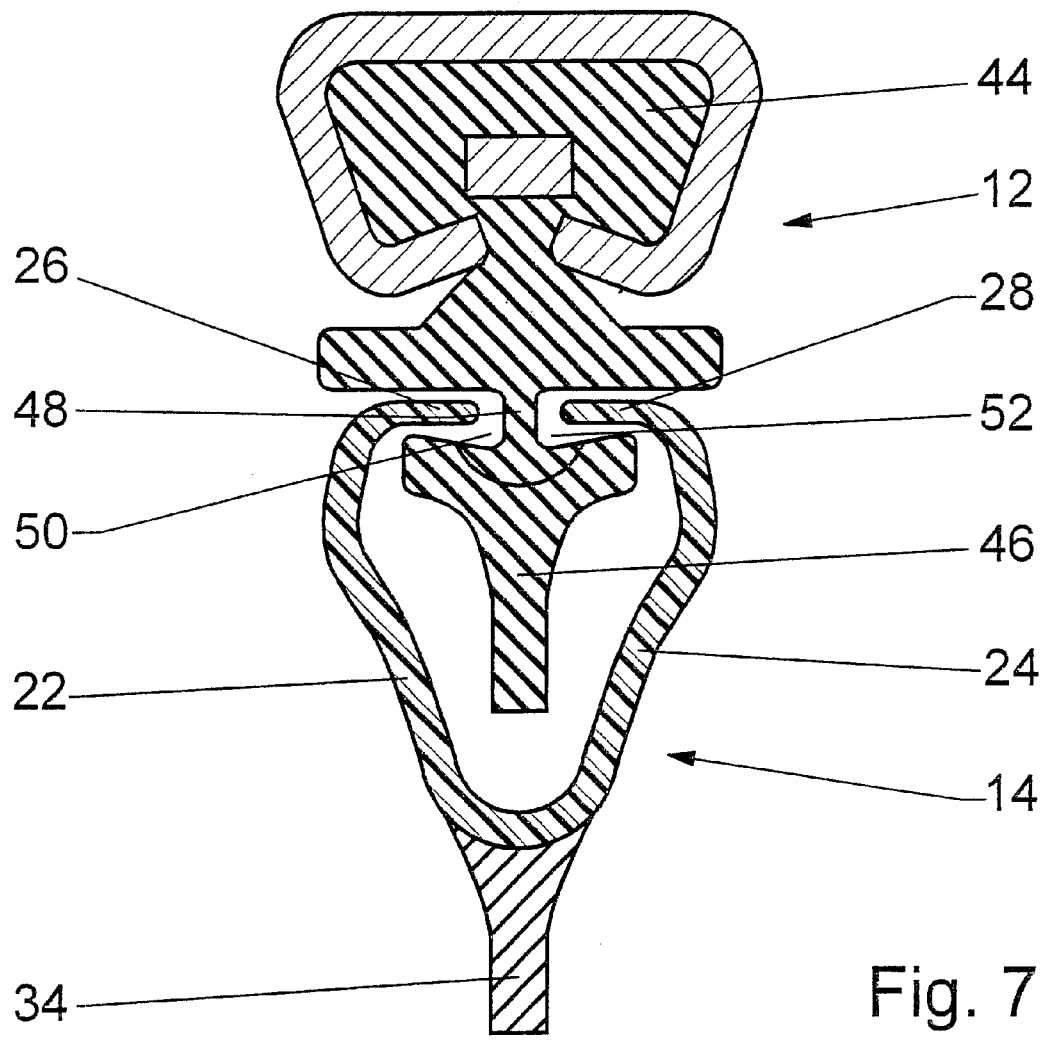
FIG. 7, a section taken along the line VII—VII in FIG. 1.

The wiper blade 10 is pivotably connected to a wiper rod 16 of a wiper arm, not shown in further detail, and has a wiper strip 12 that is supported by a support bracket system 60. Instead of the support bracket system 60, a bracketless supporter can also hold the wiper strip 12, and because of its elasticity can adapt to the curvature of a vehicle window.

The wiper strip 12 is joined by means of its head strip 44 to the support bracket system 60. The head strip 44 is adjoined via a tilting rib 48 by a wiper lip 46. The tilting rib 48, which is bounded by two lateral longitudinal grooves 50 and 52, allows the wiper lip 46 to change its positioning angle to the vehicle window, at the turning points of the pivoting motion, to suit the wiping direction.

To protect the wiper strip 12 and in particular the wiper lip 46 before a new vehicle is shipped, a guard profile 14 is slipped onto the wiper strip 12 from an outer face end 18 in the mounting direction 40. The guard profile 14 has two joined-together side cheeks 22 and 24, which are adjoined by extensions 26 and 28 that engage the longitudinal grooves 50 and 52. On the outer contour of the guard profile 14, in the region where the side cheeks 22 and 24 meet, a wiper lip 34 is provided. The wall thickness and shape of the side cheeks 22 and 24 is selected such that the wiper lip 34 can adapt elastically to a certain extent to the curvature of the vehicle window.

In the region of the outer face end 18 and an inner face end 20, the guard profile 14 has protrusions 30 and 32 on its ends; the protrusions each originate at a respective side cheek 22 and 24 and extend transversely through the interior of the guard profile 14. A first protrusion 30 in the region of the outer face end 18 originates at the side cheek 22 and extends to close to the opposed side cheek 24. It can also touch the side cheek 24 and be welded to it. On the other end of the guard profile 14, a second protrusion 32 is provided in the region of the inner face end 20. This protrusion originates at the side cheek 24 and extends toward the opposite side cheek 22, with which it forms a gap 38 that allows mounting and unmounting of the guard profile.

If the guard profile 14 is slipped by one end, which has the second protrusion 32, onto the wiper strip 12 in the mounting direction 40, the wiper lip 46 of the wiper strip 12 moves through the gap 38 past the second protrusion 32, until the end of the guard profile 14, with the first protrusion 30, rests on the end of the wiper strip 12. In this position, the wiper lip 46 of the wiper strip 12 resumes its original position, so that the wiper strip 12 is axially fixed between the protrusions 30 and 32.

To facilitate mounting, the second protrusion 32 has a chamfer 56, inclined in the mounting direction 40, which has an angle of approximately 30° from a cross-sectional plane 58. In the unmounting direction 42, the second protrusion 32 has a further chamfer 54. This chamfer 54 forms an angle of approximately 10° with the cross-sectional plane 58. This angle is dimensioned such that on the one hand it allows good unmounting of the guard profile 14 and on the other assures secure fixation of the guard profile 14.

The guard profile 14 can be made from sheet metal. Expediently, however, it comprises an extruded plastic. In that case, it is expedient to make the protrusions 30 and 32 with an ultrasonic probe; the length 36 of the protrusions 30 and 32 decreases in the direction of the wiper lip 34, so that the protrusions 30 and 32 extend essentially parallel to their opposed side cheeks 22 and 24. As a result, the possibility exists in the region of the first protrusion 30 of welding this protrusion over a large area to the opposed side cheek 24, while in the region of the second protrusion the gap 38 has a virtually constant width.

What is claimed is:

1. A wiper blade (10) with a wiper strip (12), which is surrounded by a guard profile (14) that with extensions (26, 28) formed onto its side cheeks (22, 24) engages longitudinal grooves (50, 52) of the wiper strip (12) and is fixed axially on the wiper strip (12) by inward-protruding protrusions (30, 32) in the region of its face ends (18, 20), characterized in that the protrusions (30, 32) originate at one side cheek (22, 24) of the guard profile (14), and a first protrusion (30) extends on an outer face end (18) of the guard profile (14) to be close to the opposite side cheek (22, 24) of the guard profile (14), while a second protrusion (32) on an inner face end (20) forms a gap (38) from the opposed side cheek (22, 24), so that the gap allows mounting or unmounting of the guard profile (14) in a longitudinal direction (40, 42).

2. The wiper blade (10) of claim 1, characterized in that the length (36) of the protrusions (30, 32) decreases in the direction of a wiper lip (34) of the guard profile (14), and the gap (38) is virtually constant in width.

3. The wiper blade (10) of claim 1, characterized in that the second protrusion (32) has a chamfer (56), inclined in a mounting direction (40), which in the mounting process orients the wiper lip (46) of the wiper strip (12) toward the gap (38).

4. The wiper blade (10) of claim 1, characterized in that the second protrusion (32) has a chamfer (56), inclined in a unmounting direction (42), which in the unmounting process orients the wiper lip (46) of the wiper strip (12) toward the gap (38).

5. The wiper blade, (10) of claim 1, characterized in that the second protrusion suited to has a chamfer (56) operative in a mounting direction (40), with a cross-sectional plane (58) forms a larger angle than a chamfer (54) operative in an unmounting direction (42).

6. The wiper blade (10) of claim 1, characterized in that the first protrusions (30) differ in cross section and/or longitudinal section from the second protrusions (32).

7. The wiper blade (10) of claim 1, characterized in that the guard profile (14) comprises plastic, and at least one protrusion (30, 32) is made with an ultrasonic probe.

8. The wiper blade (10) of claim 7, characterized in that the first protrusion (30) is at least partly welded to the opposed side cheek (22, 24).

* * * * *